United States Patent
Lee et al.

[11] Patent Number: 5,861,845
[45] Date of Patent: Jan. 19, 1999

[54] WIDEBAND PHASED ARRAY ANTENNAS AND METHODS

[75] Inventors: Jar J. Lee, Irvine; Ronald R. Stephens, Westlake Village; Harry T. Wang, Thousand Oaks, all of Calif.

[73] Assignee: Hughes Electronics Corporation, El Segundo, Calif.

[21] Appl. No.: 81,672

[22] Filed: May 19, 1998

[51] Int. Cl.$^6$ ...................................................... H01Q 3/22
[52] U.S. Cl. .......................................... 342/375; 342/374
[58] Field of Search .................................... 342/375, 374, 342/372

[56] References Cited

U.S. PATENT DOCUMENTS 3,766,558  10/1973  Kuechken .
5,757,318   5/1998  Reudink .................................. 342/374

OTHER PUBLICATIONS

Johnson, Richard C., et al., *Antenna Engineering Handbook*, Third Edition, Mc–Graw Hill, Inc., New York, 1993, pp. 16–19 to 16–22.

Kumar, A., *Antenna Design with Fiber Optics*, Artech House, Boston, 1996, pp. 51–58.

*Primary Examiner*—Theodore M. Blum
*Attorney, Agent, or Firm*—V. D. Duraiswamy; M. W. Sales

[57] ABSTRACT

Wideband phased array antennas are provided that eliminate the need for phase shifters in the region of the array face. In addition, they generate less beam squint than conventional antennas. In one embodiment, they include an electronic signal generator, reference and scanning manifolds and an array of n radiative modules. The signal generator generates a variable-frequency scanning signal $s_s$ and a reference signal $s_r$ wherein the frequency of the reference signal $s_r$ is substantially a selected one of the sum and the difference of the frequencies of the scanning signal $s_s$ and an operating signal $s_o$. The reference manifold receives and divides the reference signal $s_r$ into n reference signal samples which are progressively time delayed by a selectable one of m reference differential time delays $\Delta t_r$. The scanning manifold receives and divides the scanning signal $s_o$ into n scanning signal samples which are progressively time delayed by a scanning differential time delay $\Delta t_s$. Each of the radiative modules includes a mixing device, an electromagnetic radiator and a filter. The mixing device receives and mixes a respective one of the reference signal samples and a respective one of the scanning signal samples. The filter couples the mixing device to the radiator and is configured to pass the operating signal $s_o$. Accordingly, an antenna beam is radiated from the array at m selectable scan angles with each of the scan angles varying in response to the frequency of the scanning signal $s_s$. Multiband and two-dimensional embodiments are shown and described. The wideband characteristics of these antennas are especially suited for radar, electronic warfare and high data-rate communication applications.

26 Claims, 8 Drawing Sheets

WIDEBAND PHASED ARRAY ANTENNAS AND METHODS

BACKGROUND OF THE INVENTION

1. Field of the Invention

The present invention relates generally to antennas and more particularly to phased array antennas.

2. Description of the Related Art

Figure 1:
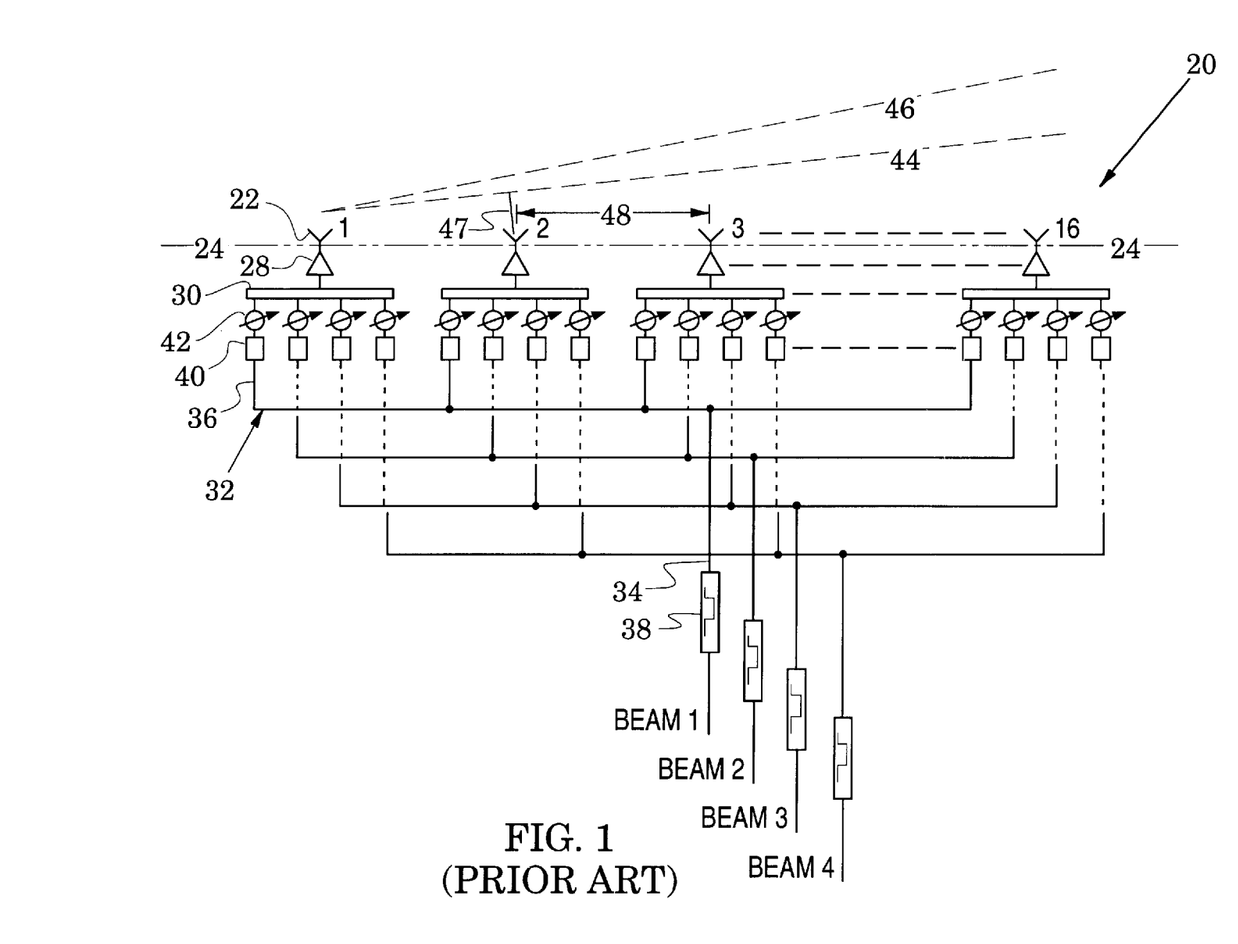
FIG. 1 is a block diagram of a conventional multibeam phased array antenna.

A portion of a conventional multibeam phased array antenna 20 is shown in FIG. 1. The antenna has a plurality of radiators 22 that are arranged along an array face 24. The radiator array is typically divided into subarrays. For example, the array might contain 1024 radiators that are divided into four subarrays that each contain 256 radiators. For simplicity, FIG. 1 illustrates a single 16 element row in one of these subarrays.

In each row, each radiator 22 is coupled by a power amplifier 28 to a respective multiplexer 30. Each radiated beam is associated with a different manifold 32 that has a primary transmission line 34 which branches into secondary transmission lines 36 that each couple to a respective one of the multiplexers 30. A programmable delay line 38 is inserted into the primary transmission line 34 and a filter 40 and an adjustable electrical phase shifter 42 are inserted into each secondary transmission line 36. For clarity of illustration, each primary transmission line is labeled with the number of its respective antenna beam.

Operation of the phased array antenna can be separated into coarse and fine beam pointing processes. In a coarse beam pointing process, an appropriate time delay is programmed into each beam #1 delay line of the four subarrays. These time delays generate a selected coarse phase front (e.g., the coarse phase front 44) across the antenna array and, accordingly, a #1 antenna beam is radiated orthogonally to that coarse phase front. In a fine beam pointing process, appropriate phase shifts are selected with the phase shifters 42 that are associated with the manifold of beam #1. These phase shifts modify the coarse phase front to generate a fine phase front (e.g., the fine phase front 46) across the antenna array and, accordingly, the #1 antenna beam is radiated orthogonally to that phase front. This operational process is repeated for each of the other beams, i.e., beams #2, #3 and #4.

When data (e.g., pulses) are placed on the radiated signals, the signal spectrum is widened. This can lead to an undesirable increase in beam divergence unless the phase shift $\Delta\phi$ between adjacent antenna elements satisfies the relation $\Delta\phi=2\pi f \Delta t$ for all frequency components f with the signal spectrum. Here $\Delta t$ is the time required for radiation to travel, for example, along the path 47 in FIG. 1 to form phase front 44. This undesirable beam broadening in wide bandwidth signals is commonly referred to as "beam squint".

In the antenna 20 of FIG. 1, the delay lines 38 insert an appropriate time delay $\Delta t$ to form the coarse wavefront 44. This $\Delta t$ is constant for all frequency components so that the adjacent-element phase shift satisfies the relation $\Delta\phi=2\pi f \Delta t$. In contrast, the phase shifters 42 typically insert a phase shift that is approximately constant across the instantaneous signal bandwidth and thus the adjacent phases do not satisfy this relation. Accordingly, each radiated beam is preferably coarsely steered to a nominal beam angle and then finely steered about this nominal angle. The coarse steering will not induce beam squint but the fine steering will.

The spacing (49 in FIG. 1) between the radiators 22 is set so as to avoid the generation of undesirable beam lobes (typically called "grating lobes"). In an antenna in which the beam is to be steered ±90°, for example, the radiator spacing must be $\leq \lambda_{min}/2$ in which $\lambda_{min}$ is the smallest radiated wavelength. If the antenna 20 of FIG. 1 is configured to operate over the bandwidth of 6 to 18 GHz, for example, the spacing might be on the order of 8.3 millimeters.

It can be appreciated, therefore, that it is a challenge to position multiple sets of phase shifters and filters into each radiator position along with an associated multiplexer and power amplifier. Each phase shifter also typically has associated control lines and may have an associated amplifier driver. These elements must also be fitted into a volume that is set by the radiator spacing 48. In addition, the electrical phase shifters 42 are typically lossy, complex and expensive. It would, therefore, be advantageous to have phased array structures that eliminate the need at the array face for multiple sets of phase shifters and their attendant multiplexers, driver amplifiers and control wires. Preferably, these structures should generate antenna beams that have low values of beam squint.

SUMMARY OF THE INVENTION

The present invention is directed to wideband phased array antennas that require significantly less antenna structures and elements than conventional antennas. In particular, antenna structures that eliminate the need for phase shifters in the region of the array face. It is also directed to wideband phased array antennas that have less beam squint than conventional antennas.

These goals are realized with an electronic signal generator, reference and scanning manifolds and an array of radiative modules. The signal generator generates a variable-frequency scanning signal $s_s$ and a reference signal $s_r$ wherein the frequency of the reference signal $s_r$ is substantially a selected one of the sum and the difference of the frequencies of the scanning signal ss and an operating signal $s_o$.

The reference manifold receives and divides the reference signal $s_r$ into n reference signal samples which are progressively time delayed by a selectable one of m reference differential time delays $\Delta t_r$. The scanning manifold receives and divides the scanning signal $s_s$ into n scanning signal samples which are progressively time delayed by a scanning differential time delay $\Delta t_s$.

Each of the radiative modules includes a mixing device, an electromagnetic radiator and a filter. The mixing device receives and mixes a respective one of the reference signal samples and a respective one of the scanning signal samples. The filter couples the mixing device to the radiator and is configured to pass the operating signal $s_o$. Accordingly, an antenna beam is radiated from the array at m selectable scan angles with each of the scan angles varying in response to the frequency of the scanning signal $s_s$.

Antennas of the invention have no beam squint at the m selectable scan angles. Although beam squint increases as the scan angle is varied in response to the frequency of the scanning signal $s_s$, this increase can be controlled by increasing the value of m (i.e., the number of reference differential time delays $\Delta t_r$ in the reference manifold).

In contrast to conventional phased-array antennas, antennas of the invention have significantly reduced packaging complexity at the array face. Multibeam and two-dimensional embodiments are shown and described. The wideband characteristics of these antennas are especially suited for radar, electronic warfare and high data-rate communication applications.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figures 2, 3:
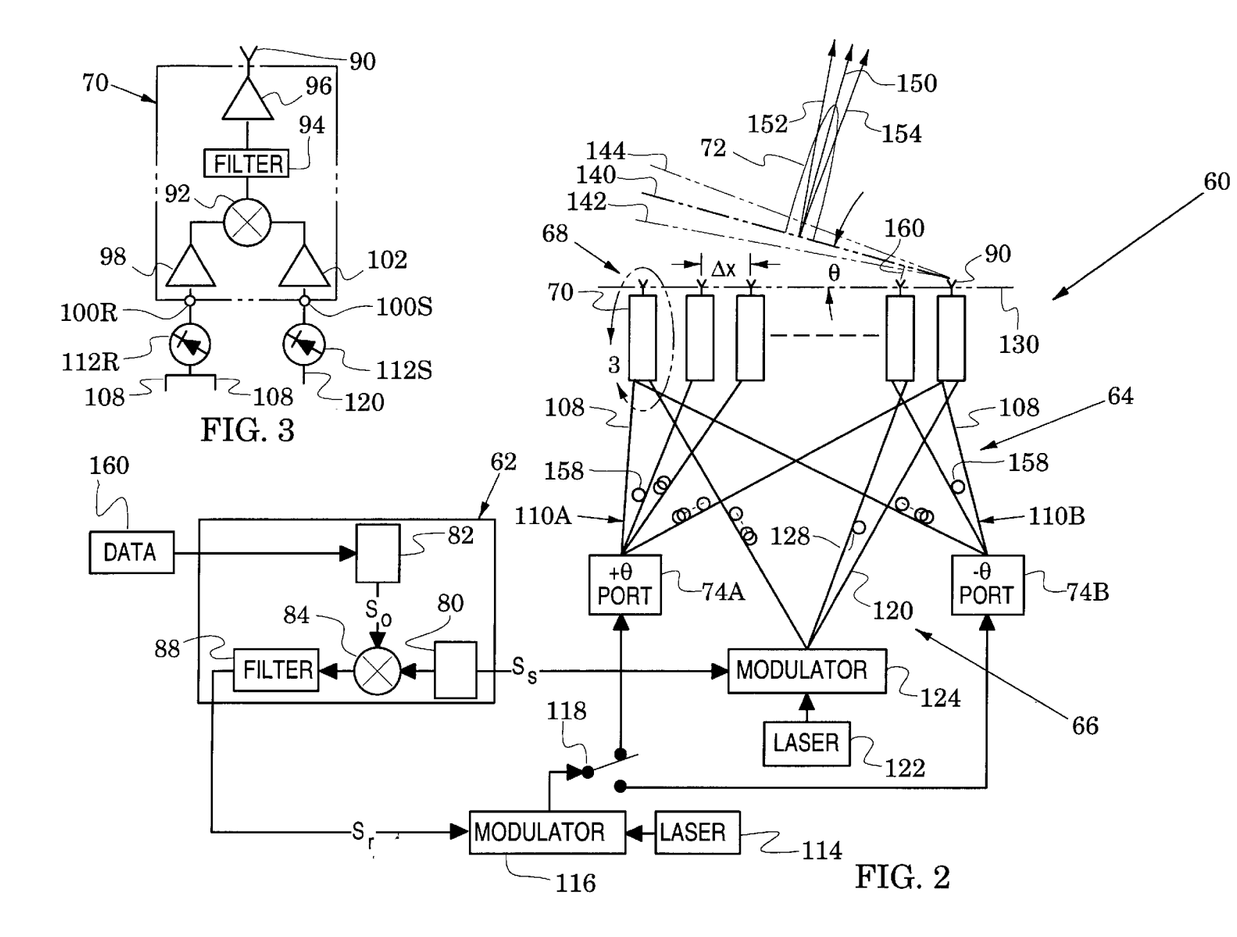
FIG. 2 is a block diagram of a phased array antenna of the present invention.
FIG. 3 is an enlarged view of a radiative module within the curved line 3 of FIG. 2.

FIG. 2 illustrates a wideband phased array antenna 60 which has an electronic signal generator 62, a reference manifold 64, a scanning manifold 66 and an array 68 of n radiative modules 70. The reference manifold 64 and the scanning manifold 66 respectively couple reference signals $s_r$ and scanning signals $s_s$ to the array 68 where they are mixed and filtered to generate operating signals $s_o$ that are radiated from the radiative modules 70 to form an antenna beam 72.

In particular, the reference manifold 64 receives reference signals $s_r$ at a selected one of reference ports 74A and 74B and applies phase-shifted versions of these signals to the radiative modules 70 to realize coarse pointing of the antenna beam 72. In contrast, the scanning manifold 66 receives scanning signals $s_s$ and the electronic signal generator 62 varies the frequency of the scanning signal to realize fine pointing of the antenna beam 72.

In more detail, the electronic signal generator 62 includes a scanning-signal generator 80 and an operating-signal generator 82 that respectively generate a variable frequency scanning signal $s_s$ and an operating signal $s_o$. These signals are mixed in a mixer 84 and filtered in a filter 88 to generate a reference signal $s_r$. A radiative module 70 is enlarged in FIG. 3 to show that it includes a radiator 90 and a mixing device in the form of a mixer 92. These elements are coupled together by a filter 94 and a power amplifier 96. A reference buffer amplifier 98 is positioned between a reference input port 100R and the mixer 92 and a scanning buffer amplifier 102 is positioned between a scanning input port 100S and the mixer.

The reference manifold 64 includes m sets of n optical fibers 108. In the reference manifold 64 of FIG. 2, m=2, so that the reference manifold has optical fiber sets 110A and 110B. The fiber sets form sub-manifolds within the reference manifold. Each optical fiber terminates at an output end in a photodetector 112R as shown in FIG. 3. At the input ends, the optical fibers 108 are fed by an optical signal generator that has an electrical modulation port. FIG. 2 shows an exemplary generator in the form of a laser 114 and an exemplary modulation port formed by a Mach-Zehnder intensity modulator 116. An optical switch 118 facilitates selection of either of the optical fiber sets 110A and 110B.

The scanning manifold 66 is formed with n optical fibers 120. Each of these optical fibers terminates at an output end in a photodetector 112S as shown in FIG. 3. At the input ends, the optical fibers 120 are also fed by an optical signal generator that has an electrical modulation port. As in the reference manifold 64, a laser 122 and a Mach-Zehnder intensity modulator 124 are used for these functions.

Thus, the reference manifold and the scanning manifold have electrical inputs and electrical outputs, i.e., an electrical signal at a manifold input is delivered as an electrical signal at a manifold output. This process is realized by coupling electrical-to-optical signal conversions at manifold inputs to optical-to-electrical signal conversions at manifold outputs with optical fibers.

To describe the operation of the antenna 60, it is helpful to initially describe operation of the scanning manifold 66 and the scanning-signal generator 80. Sweeping the scanning-signal generator causes the scanning signal $s_s$ to be swept over an exemplary frequency range having a frequency span $\Delta f$. In response, the mixing action of the mixer 84 causes the reference signal $s_r$ to be swept over a different frequency range that has the same frequency span $\Delta f$. In different embodiments of the invention, the filter 88 can be configured to select a reference signal $s_r$ whose frequency is the sum of the frequencies of the scanning signal $s_s$ and the operating signal $s_o$ or a reference signal $s_r$ whose frequency is the difference of the frequencies of the scanning signal $s_s$ and the operating signal $s_o$.

The electrical reference signal $s_r$ and the scanning signal $s_s$ are carried by the reference and scanning manifolds and delivered to each radiative module 70. In an exemplary radiative module, they are respectively delivered to the reference port 100R and the scanning port 110S in FIG. 3. They are then mixed in mixer 92 and filtered in filter 94 to form the operating signal $s_o$. The filter 94 is configured to be in accordance with the filter 88 in the electronic signal generator 62. If the filter 88 passes a reference signal $s_r$ that is the sum of the scanning signal $s_s$ and the operating signal $s_o$, for example, then the filter 94 passes an operating signal $s_o$ that is the difference between the the scanning signal $s_s$ and the reference signal $s_r$.

As the scanning signal $s_s$ is swept over its frequency span $\Delta f$, the frequency of the radiated operating signal $s_o$ remains constant because of the structure of the electronic signal generator 62. The radiator 90 of FIG. 3 receives the operating signal $s_o$ from the filter 94 and radiates it outward. The optical fibers 120 of the scanning manifold are cut so their lengths progressively differ by a differential length $\Delta L$ and they, therefore, impart time delays that progressively differ by a differential time delay $\Delta T$.

In FIG. 2, the increase of differential length $\Delta L$ from one optical fiber 120 is indicated by the addition of a fiber loop 128 in an adjacent optical fiber 120. Accordingly, the $n^{th}$ fiber 128 has n-1 fiber loops 128. Because the length of the optical fibers 120 progressively increase, the phase slope (differential output phase in response to a differential input frequency) also progressively increases. As a result, the radiated signals from the radiators 90 in FIG. 2 will have phases that progressively differ across an array face 130 by a differential phase $\Delta\phi$.

Therefore, sweeping the scanning signal $s_s$ over its frequency span $\Delta f$ causes a nominal phase front 140 in FIG. 2 to tilt between phase front limits 142 and 144 (a phase front is a surface having equal-phase signal components). If the antenna beam 72 has a nominal direction 150, it then tilts between limit directions 152 and 154. To summarize this operation, scanning an antenna beam about a nominal direction is realized by frequency sweeping of the scanning signal $s_s$ and the beam has the frequency of the operating signal $s_o$.

The operation of the reference manifold 66 is exemplified by that of the optical fiber set 10B. The fibers 108 of this set are cut so the lengths of the fibers progressively increase by a differential length represented by the fiber loop 158. Functionally, the fibers 108 of this set are cut so that the nominal phase front 140 is generated when the scanning signal is set to its nominal value and when the reference signal $s_r$ flows through the fiber set 110B (as selected by the switch 118).

Relative to each radiative module 70, its adjacent radiative module will be spaced from the phase front 140 by a space 160 which generates a differential phase $\Delta\alpha$. The optical fiber set 110B will establish the phase front 140 if the length of the fiber loop 158 is sufficient to also generate the differential phase $\Delta\alpha$. This will be the case if the fiber loop has the same electrical length as the space 160.

Thus, the optical fiber set 110B is configured $s_o$ that the nominal phase front 140 is generated when the frequencies of the scanning signal $s_s$ and the reference signal $s_r$ are at their nominal values. In FIG. 2, the nominal phase front 140 is tilted from the array face 130 by an angle $\theta$. and the manifold port 74B is correspondingly labeled as a $+\theta$ reference port.

The optical fibers 108 of the optical fiber set 110A also progressively differ by the fiber loop 158 but in an opposite direction from that of the fiber set 110B (i.e., the fiber loop 158 is added from right to left in the fiber set a 110B and added from left to right in the fiber set 110A). When the switch 118 is set to select the optical fiber set 110A, a nominal phase front will be generated with the frequencies of the scanning signal $s_s$ and the reference signal $s_r$ set at their nominal values and this phase front will be tilted by an angle that is the conjugate of the angle $\theta$. Accordingly, the manifold port 74A is labeled as a $-\theta$ reference port.

When the frequencies of the scanning signal $s_s$ and the reference signal $s_r$ are set at their nominal values, the switch 118 can be used to select between a phase front at a $+\theta$ angle and a phase front at a $-\theta$ angle. In either selected setting, the frequency of the scanning signal can then be swept to tilt the phase front in both directions from the $\pm\theta$ settings.

For clarity of description, it can be said that selection between the optical fiber sets 110A and 110B provides a coarse beam scan and adjustment of the frequency of the scanning-signal generator 80 provides a fine beam scan. If the fine beam scan is configured to provide a scan of $\pm\theta$, then the coarse and fine scans can continuously scan the antenna beam 72 over a total scan angle of $\pm 2\theta$. The scan angle range of the fine scan can be set in two ways. First, increasing the length of the fiber loop 158 will increase the phase slope of the scanning manifold 66 and thus increase the fine scan angle. Secondly, increasing the frequency span $\Delta f$ of the scanning signal $s_s$ will cause a given phase slope to increase the fine scan angle.

Information is preferably added to the operating signal $s_o$ as is done in FIG. 2 with the data modulator 160 that is coupled to the operating-signal generator 82. Data (e.g., data pulses) will widen the spectrum of the $s_o$. If there are processes (e.g., mixing process) in a phased array antenna that generate a substantially constant phase variation independent of frequency, a phase front such as the nominal phase front 140 will be disturbed. Accordingly, the antenna beam 72 will be widened and/or misdirected. This undesirable result is generally referred to as "beam squint".

In a feature of the invention, the antenna 60 of FIG. 2 generates a beam at the reference angles $\pm\theta$ without beam squint. Beam squint is generated when the beam position is scanned away from these reference angles by changing the frequency of the scanning signal $s_s$.

However, beam squint over the antenna's scan range can be further decreased by adding additional reference sub-manifolds to the sub-manifolds 74A and 74B. This narrows the region of scanning that must be realized by changing the frequency of the scanning signal $s_s$. The features of the invention are further explained with the help of system equations (1–5) that are shown and described below. These equations are preceded by the following description of other manifold embodiments.

Figure 4A:
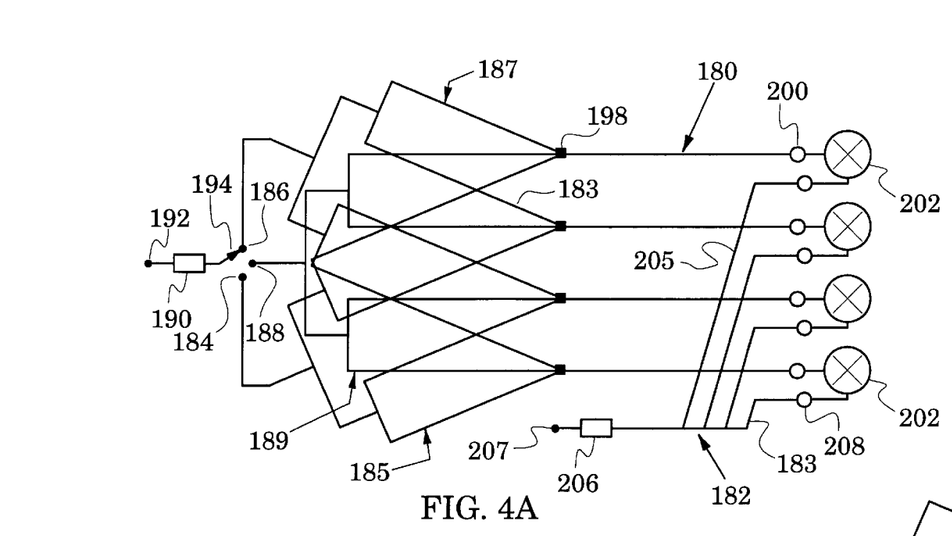
FIGS. 4A–E are block diagrams of reference and scanning manifold embodiments for the phased array antenna of FIG. 2.

Manifolds of the invention and their progressive phase delays can be realized with a variety of structures as illustrated in FIGS. 4A–4D. These exemplary figures are illustrated with reference to four mixers 202 which represent the mixers of the radiative modules 70 of FIG. 2. FIG. 4A shows a reference manifold 180 that has $\pm\theta$ reference ports 184 and 186 and respective sub-manifolds 185 and 187. In addition, the reference manifold 180 has a 0° reference port 188 and respective sub-manifold 189.

The manifolds 185 and 187 are formed in a manner similar to that of the reference manifold 64 of FIG. 2. For the desired phase front of the 0° reference port 188 and sub-manifold 189, the angle in FIG. 2 would be zero and the space 160 would also be zero. Accordingly, the optical fibers 183 of this sub-manifold are cut so their lengths progressively differ by a differential length $\Delta L=0$, i.e., the fibers of the sub-manifold 189 are of equal length.

The reference manifold 180 includes an optical signal generator 190 having a modulation port 192 for application of a reference signal $s_r$. In this embodiment, the signal generator 190 is a directly modulated semiconductor laser. An optical switch 194 allows the signal generator 190 to be selectively coupled to any of the manifolds 185, 187 and 189.

The output ends of the sub-manifolds 185, 187 and 189 are joined in optical summers 198 which couple to optical detectors 200. At this point the electrical reference signal $s_r$ is recovered and fed from the reference manifold 180 to a respective one of mixers 202 that are similar in function to the mixer 92 of FIG. 3.

The input end of the scanning manifold 182 is coupled to a directly modulated semiconductor laser 206 that has a modulation input 207. The output ends of the manifold's optical fibers 205 couple to optical detectors 208. At this point the electrical scanning signal $s_s$ is recovered and fed to a respective one of mixers 202.

In comparison to the reference manifold 64 of FIG. 2, the reference manifold 180 has an additional sub-manifold 189 with an additional reference port at a reference angle of 0°. The time delays of the reference manifolds and scanning manifolds of FIGS. 2 and 3A are formed with optical transmission lines (e.g., optical waveguides). These manifolds include modulatable optical signal generators at one manifold end and optical detectors at another manifold end.

Thus, they have electrical input ports and electrical output ports and the reference signals $s_r$ and scanning signals $s_s$ are transported between these ports with optical carrier signals.

Figure 4B:
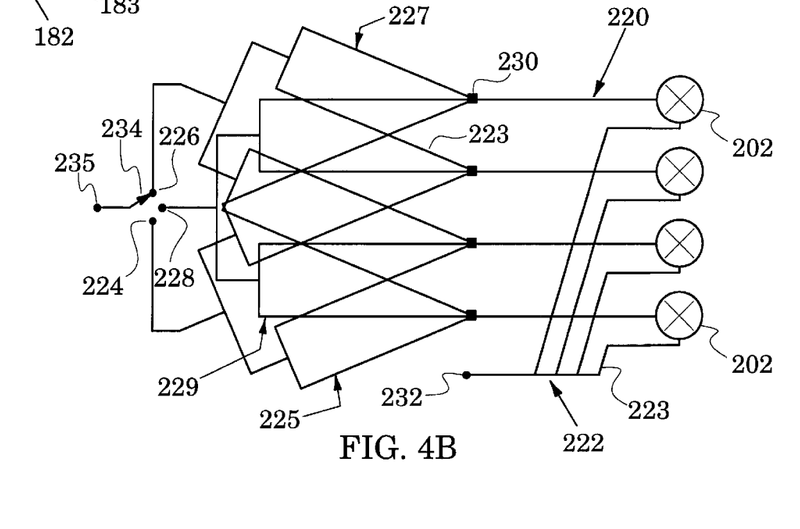

In contrast, FIG. 4B illustrates another reference manifold 220 and scanning manifold 222 that are formed with electrical transmission lines 223. The reference manifold has ±θ reference ports 224 and 226 and respective sub-manifolds 225 and 227. Similar to the reference manifold of FIG. 4A, this reference manifold also has a 0° reference port 228 and a sub-manifold 229. An electrical switch 234 coupled to a manifold input 235 facilitates selection of the sub-manifolds 225, 227 and 229. The scanning manifold 222 is also formed with electrical transmission lines 223 and has an input port 232.

The electrical transmission lines can be any conventional form, e.g., striplines, microstrip lines, and coaxial lines. They can easily be joined at transmission-line junctions 230. Because they do not require transition to an optical carrier, the reference manifold 220 and scanning manifold 222 do not require the optical signal generators and optical detectors of FIG. 4A.

Figure 4C:
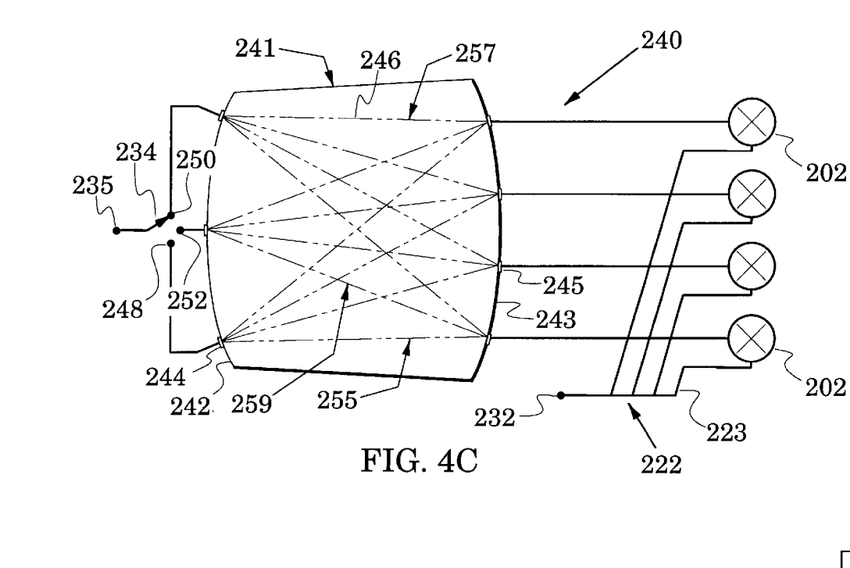

FIG. 4C shows a reference manifold 240 that is similar to the reference manifold 220 of FIG. 4B with like elements indicated by like reference numbers. However, the reference manifold 240 replaces sub-manifolds 225, 227 and 229 with a lens 241 that forms input and output lens surfaces 242 and 243. The input surface 242 carries three antennas (e.g., dipoles) 244 which radiate reference signals through the lens 241. The output surface 243 carries four similar antennas 245 which receive the radiated signals.

In this manifold, the electrical transmission lines 223 of FIG. 4B are replaced with transmission paths 246 through the lens 241 that connect input antennas 244 and output antennas 245. The lens is configured and the antennas positioned so that the paths 246 form ±θ reference ports 248 and 250 and a 0° reference port 252 similar to ports 224, 226 and 228 of FIG. 4B. FIG. 4C also includes the scanning manifold 222 of FIG. 4B.

Essentially, the transmission paths 246 form sub-manifolds 255, 257 and 259 that are functionally equivalent to the sub-manifolds 225, 227 and 229 of FIG. 4B. In other manifold embodiments of the invention, the scanning manifold 222 could also be realized by transmission paths through the lens 241. It could, for example, be realized with another input antenna similar to the antenna 244 that generates the paths of sub-manifold 255.

The lens can be realized with any of various dielectrics, e.g., air or glass as long as the input and output antennas 244 and 245 are properly positioned to generate transmission paths 246 having appropriate lengths. When the dielectric is air, the surfaces 242 and 243 represent imaginary positioning surfaces for proper locating of the antennas 244 and 245. When the lens is realized in the optical region, the antenna symbols 244 and 243 represent optical signal generators and photodetectors that are appropriately positioned.

Figure 4D:
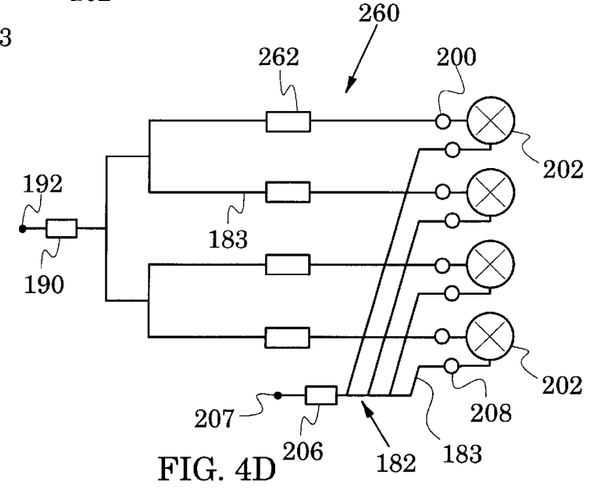

FIG. 4D shows another reference manifold 260 that is similar to the reference manifold 180 of FIG. 4A with like elements indicated by like reference numbers. However, the reference manifold 260 replaces the sub-manifolds 185, 187 and 189 of FIG. 4A with a single manifold having four programmable delay lines 262. The delays generated by the delay lines can be selected to realize the progressive time delays of the sub-manifolds. FIG. 4D has the same scanning manifold 182 that is used in FIG. 4A.

Figure 4E:
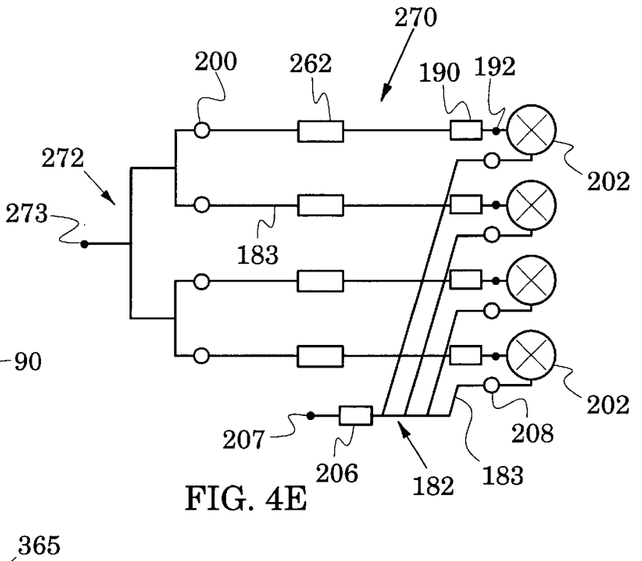

The exemplary manifolds of FIGS. 4A–4D can also be used in the receive mode. FIG. 4E illustrates, for example, a receive reference manifold 270 that is similar to the reference manifold 260 of FIG. 4D with like elements indicated by like reference numbers. In the receive manifold 270, however, the positions of the optical signal generator 190 and the optical detectors 200 are interchanged to accommodate the reversed signal paths. In addition, each mixer 202 is provided with its own signal generator 190. FIG. 4E has the same scanning manifold 182 that is used in FIG. 4A.

In receive operation of the manifolds of FIG. 4E, reflected operational signals $s_o$ enter the mixers 202 and are converted to reference signals $s_r$ with scanning signals $s_s$ that are generated by optical detectors 208. The converted reference signals are then placed on optical carrier signals in optical signal generators 190 and sent through programmable delay lines 262. The delayed signals are then detected in optical detectors 200 and combined in a corporate feed 272 to produce a coherent vector sum at a feed output 273. When receiving incoming operational signals $s_o$, the delay lines 262 are programmed just as in the transmit operation of the reference manifold 260 of FIG. 4D. In contrast, however, they are programmed to form conjugate manifolds (e.g., if the manifolds are programmed to generate a transmit beam having a transmit beam angle, they are subsequently programmed to form a receive manifold having a receive beam angle that is the conjugate of the transmit beam angle).

The reference manifolds 185, 187 and 189 of FIG. 4A can also be used in a receive configuration similar to that of FIG. 4E but the fiber lengths must be carefully controlled to prevent destructive phase interference in the optical carrier signals. Destructive phase interference may also be avoided by selecting the frequencies of the optical signal generators 190 and 206 to differ by more than the bandwidth of the photodetectors 200 and following electronics.

FIGS. 2 and 4A–4E show various reference and scanning manifolds for forming and scanning an antenna beam. These forming and scanning processes are summarized in the flow chart 280 of FIG. 5.

Figure 5:
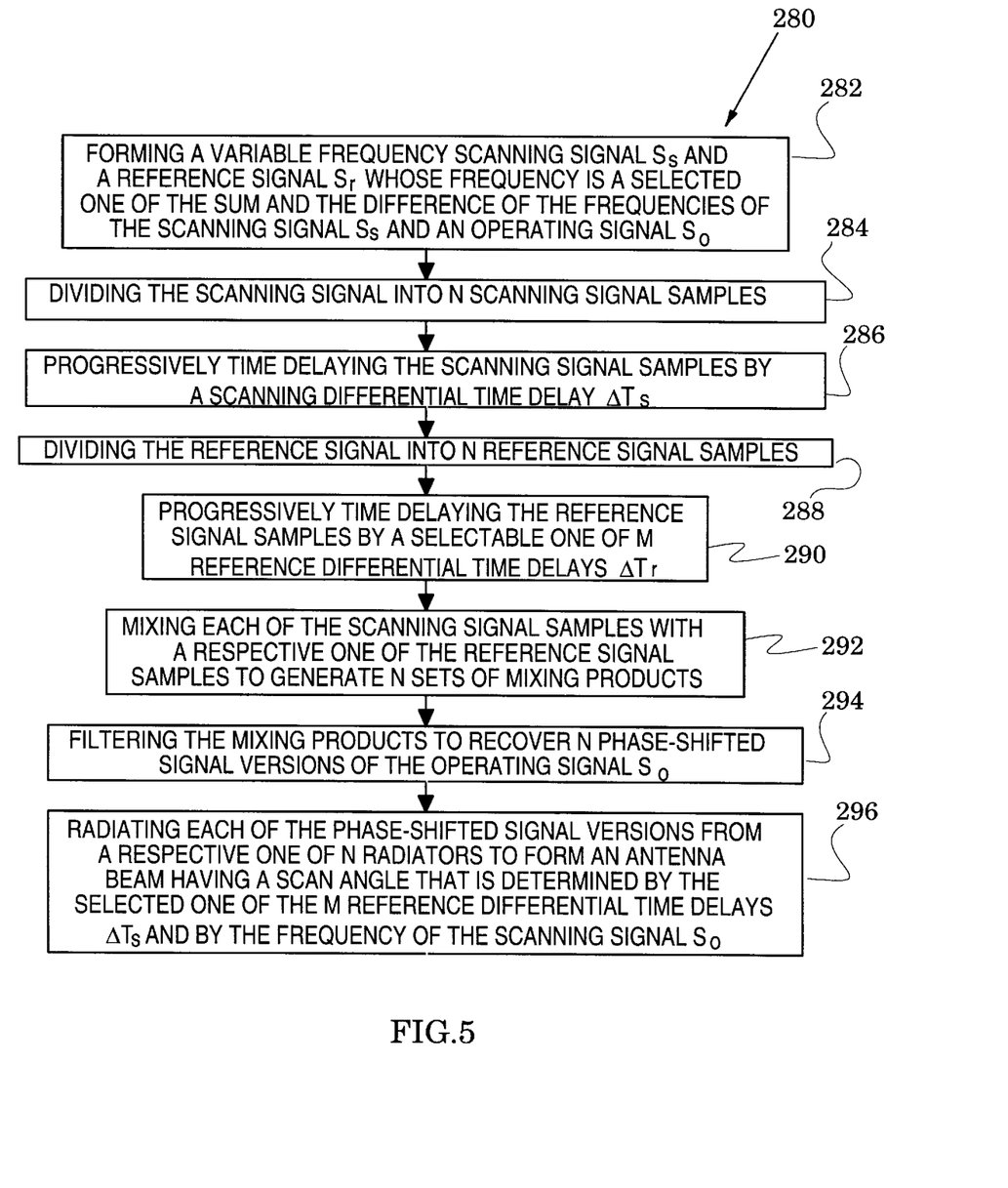
FIG. 5 is a flow chart that describes process steps in the phased array antenna of FIG. 2.

In a first process step 282, a variable frequency scanning signal $s_s$ and a reference signal $s_r$ are formed wherein the frequency of the reference signal is a selected one of the sum and the difference of the frequencies of the scanning signal $s_s$ and an operating signal $s_o$.

In a second process step 284, the scanning signal is divided into n scanning signal samples which are then progressively time delayed by a scanning differential time delay $\Delta t_s$ in step 286. In another process step 288, the reference signal is divided into n reference signal samples which are progressively time delayed by a selectable one of m reference differential time delays $\Delta t_r$ in step 290.

Each of the scanning signal samples are mixed in step 292 with a respective one of the reference signal samples to generate n sets of mixing products which are filtered in step 294 to recover n phase-shifted signal versions of the operating signal $s_o$.

In a final process step 296, each of the phase-shifted signal versions is radiated from a respective one of n radiators to form an antenna beam having a scan angle that is determined by the selected one of the m reference differential time delays $\Delta t_r$ and by the frequency of the scanning signal $s_s$.

Operation of the invention's antennas is summarized in the following equations (1–5) in which $\Delta x$ is the spacing between array elements (see FIG. 2), v is velocity of signal propagation in transmission lines and c is velocity of light in free space. In addition, N is the number of antenna elements in one dimension, $\Delta f_o$ is instantaneous bandwidth of the signal and i is an integer greater than zero:

$$\text{differential fiber lengths: } \Delta L_r = v\Delta t_r = \frac{\Delta xv}{c} \sin\theta_r, \quad (1)$$

$$\text{inter-element phase: } \Delta\phi = 2\pi[\Delta t_r f_r + \Delta t_s f_s] = \frac{2\pi}{v}[\Delta L_r f_r + \Delta L_s f_s], \quad (2)$$

$$\text{output scan angle: } \sin\theta_o = \sin\theta_r + \frac{c}{\Delta x f_o}\left(\frac{\Delta L_r + \Delta L_s}{v} f_s - i\right), \quad (3)$$

$$\text{beam squint: } \frac{d\theta_o}{df_o} = \quad (4)$$

$$\frac{c}{\Delta x f_o^2 \cos\theta_o}\left(\frac{\Delta L_r + \Delta L_s}{v} f_s - i\right) = \frac{\sin\theta_r - \sin\theta_o}{f_o \cos\theta_o},$$

and $$\text{beam squint broadening: } \frac{\Delta\theta_o}{BW} = \left|\frac{N\Delta f_o}{2f_{max}}(\sin\theta_r - \sin\theta_o)\right| \quad (5)$$

$$\text{in which } BW = \frac{\lambda_o}{L\cos\theta_o} = \frac{\lambda_o}{\frac{\lambda_{min}}{2} N\cos\theta_o} = \frac{2f_{max}}{N\cos\theta_o f_o}.$$

In equations 1–5, the subscripts r, s and o respectively refer to a reference signal $s_r$, a scanning signal $s_s$ and an operating signal $s_o$ and it is assumed that the filter 88 of FIG. 2 is configured to select $s_o = s_r - s_s$ (similar equations describe embodiments in which this filter is configured to select $s_o = s_s - s_r$ and $s_o = s_s + s_r$). The transmission lines of the scanning manifold progressively differ by a differential length $\Delta L_s$ and those of the reference manifold differ by a differential length $\Delta L_r$. The angle $\theta_r$ refers to the antenna scan angle $\theta$ in FIG. 2 that is determined by the reference sub-manifold 110A when the scan signal $s_s$ is at its nominal mid-range value. In the equations, $\Delta L_r$ is negative for negative reference angles (e.g., the reference angle $-\theta_r$ that is determined by the reference sub-manifold 110B in FIG. 2).

Equation (1) indicates differential fiber lengths in the reference manifolds that realize reference scan angles $\theta_r$. Equation (2) expresses the phase between array elements (e.g., radiators 90 in FIG. 2).

Equation (3) shows that the scan angle $\theta$ has a value $\theta_r$ determined by a reference sub-manifold when the frequency of the scan signal $s_s$ has a nominal value of $iv/(\Delta L_r + \Delta L_s)$. In an important feature of the invention, equation (4) indicates that beam squint is zero for this scan angle (i.e., beam squint is zero at each reference angle that is generated by each reference sub-manifold). Varying the scan signal's frequency about this nominal value scans the antenna beam (72 in FIG. 2) about the angle associated with the reference port and reference sub-manifold. As the scan frequency moves away from the nominal value of $iv/(\Delta L_r + \Delta L_s)$, the squint increases at a rate that is comparable to that of conventional phased array antennas as they scan away from broadside (i.e., $(\tan\theta_o)/f_o$).

Equation (5) relates beam broadening relative to a diffraction-limited beam width in which it is assumed that the antenna has N elements and the element spacing $\Delta x$ is set to $\lambda/2$ at the highest operating frequency (i.e., element spacing has been set to suppress generation of grating lobes). It is noted that beam broadening is not dependent upon the operating frequency $f_o$ because beam squint and diffraction-limited beam width both depend upon $1/f_o$. Equation (5) shows that beam broadening is a function of the number of array elements N, the scan and reference port angles $\theta_o$ and $\theta_r$, the instantaneous bandwidth $\Delta f_o$ and maximum design frequency $f_{max}$.

Figures 6, 7:
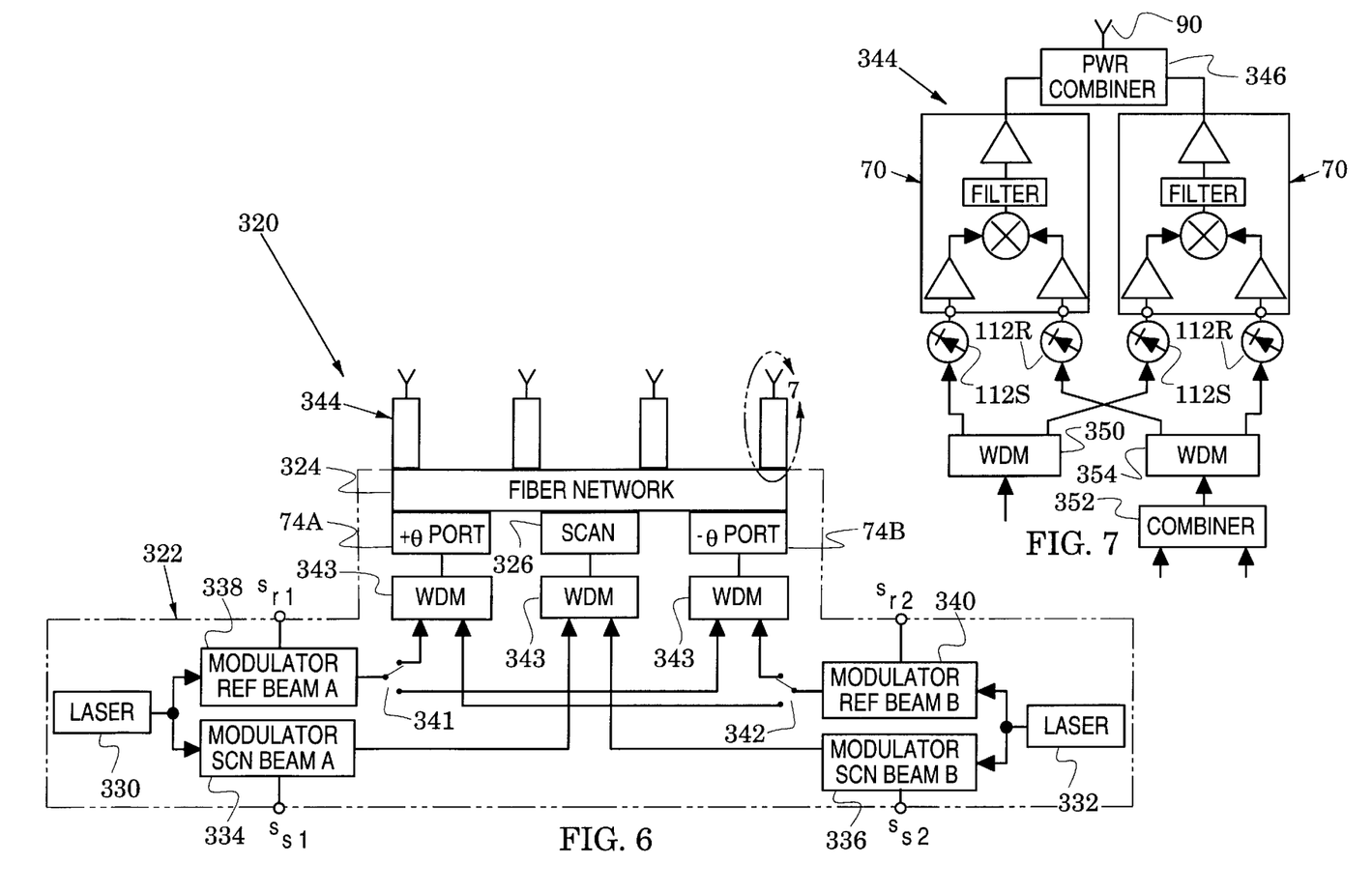
FIG. 6 is a block diagram of a multibeam phased array antenna of the present invention.
FIG. 7 is an enlarged view of a radiative module within the curved line 7 of FIG. 6.

The teachings of the invention can be extended to multi-beam antennas as shown in the multibeam antenna 320 of FIG. 6. This antenna has a reference and scanning manifold 322 that is similar to the reference manifold 64 and scanning manifold 66 of FIG. 2. It has the reference ports 74A and 74B of FIG. 2 and its fiber network 324 includes the fiber sets 110A and 110B and scanning fibers 120 of FIG. 2. The scan port 326 indicates the common input of the scanning fibers 120 of FIG. 2.

The antenna 320 has first and second lasers 330 and 332 that operate at different wavelengths. These lasers are provided with first and second scanning modulators 334 and 336 which are modulated by first and second scanning signals $s_{s1}$ and $s_{s2}$. They are also provided with first and second reference modulators 338 and 340 which are modulated by first and second reference signals $s_{r1}$ and $s_{r2}$. These reference modulators are switched via switches 341 and 342 into the appropriate reference ports 74A and 74B. Although not shown, the scanning signals and reference signals are generated with electronic signal generators similar to the generator 62 of FIG. 2. The two sets of scanning signals and reference signals can be carried by the single fiber network 324 because they are first combined in optical wavelength division multiplexers (WDM) 343.

FIG. 7 shows an exemplary radiative module 344 of the antenna 320. This module essentially includes two of the radiative modules 70 of FIG. 3 except a single radiator 90 is coupled by a power combiner 346 to the radiative modules. FIG. 7 also shows that the reference and scanning manifold 322 of FIG. 6 includes two sets of reference and scanning optical detectors 112R and 112S. The scanning signals from the fiber network 324 are coupled through a WDM 350 to the scanning optical detectors 112S and reference signals from reference sub-manifolds of the fiber network 324 are coupled through an optical combiner 352 and a WDM 354 to the reference optical detectors 112R.

Operation of the antenna 320 is similar to operation of the antenna 60 of FIG. 2 except that optical carriers of different wavelengths are used to carry different sets of reference signals $s_r$ and scanning signals $s_s$ through the antenna's reference and scanning manifolds. Each set forms its own operating signal $s_o$ which is radiated from radiators 90 to form an independently scanned antenna beam. The different wavelength optical carriers are accommodated through the use of input and output WDM's.

Figure 8:
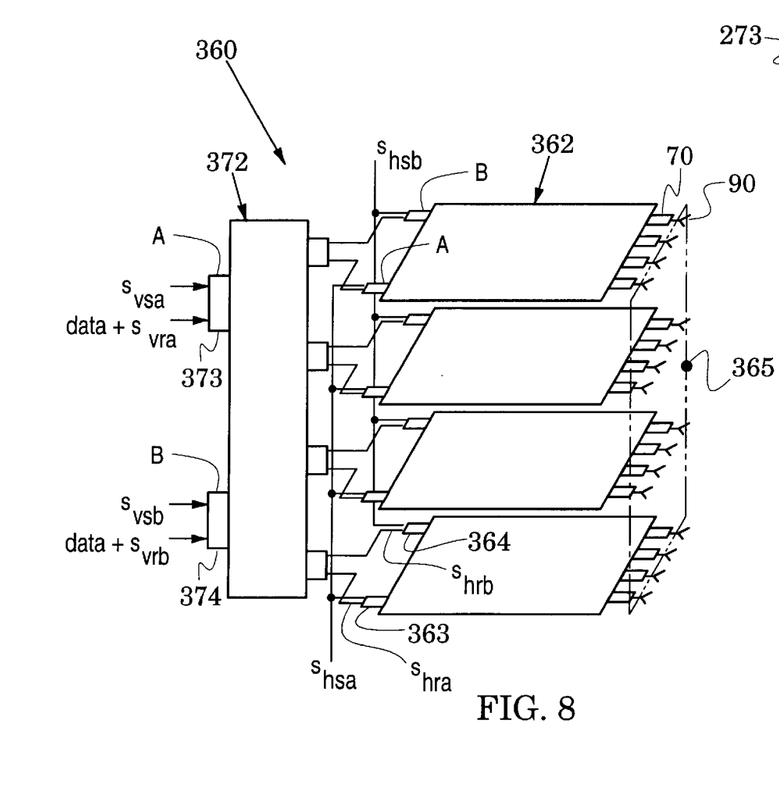
FIG. 8 is a block diagram of a two-dimensional multibeam phased array antenna of the present invention.

The teachings of the invention can be further extended to two-dimensional scanning as shown in the two-dimensional two-beam antenna 360 of FIG. 8. Each of horizontal manifold structures 362 receives signals through signal input ports 363 and 364 and radiates signals through a plurality of radiative modules 70 and radiators 90. The manifold structures 362 are similar to the structure of the antenna 320 of FIG. 6 less the lasers 330 and 332, the A-beam modulators 334 and 338 and the B-beam modulators 336 and 340. The ports 363 and 364 facilitate the application of scanning and reference signals for respective generation of antenna beams A and B as indicated in FIG. 8 by the attached A and B port labels. The radiators 90 are positioned to form the antenna's array face 365.

The antenna 360 also includes a vertical manifold structure 372 that is similar to the horizontal manifold structures 362 less the power combiner 346 and radiator 99 of FIG. 7. The vertical manifold has signal input ports 373 and 374 which facilitate the application of scanning and reference signals for respective generation of antenna beams A and B as also indicated in FIG. 8 by the attached A and B port labels.

A horizontal scanning signal $s_{hsa}$ is generated in an electronic signal generator (not shown) and delivered to the A-beam ports 363 of the horizontal manifold structures 362. This scanning signal is used in the generation of a first antenna beam A. A vertical scanning signal $s_{vsa}$ and a vertical reference signal $s_{vra}$ are also generated in the electronic signal generator and delivered to the A-beam port 373 of the vertical manifold structure 372. To reduce beam squint, data is preferably carried on the reference signal $s_{ra}$.

In generation of a first antenna beam A, the vertical scanning signal $s_{vsa}$ and the vertical reference signal $s_{vra}$ mix to generate a horizontal reference signal $s_{hra}$ which is directed to A-beam ports 363 of the horizontal manifold structures 362. It mixes with the horizontal scanning signal $s_{hsa}$ to generate A-beam operational signals $s_{oa}$ that are radiated from the radiators 90 to form the first antenna beam A. Thus, the first antenna beam A is formed with the vertical scanning signal $s_{vsa}$, the vertical reference signal $s_{vra}$ and the horizontal scanning signal $s_{hsa}$.

A second antenna beam B is formed and radiated in a similar manner. It is formed with a horizontal scanning signal $s_{hsb}$ that is applied at B-beam ports 364 of the the horizontal manifold structures 362 and a vertical scanning signal svra and a vertical reference signal $s_{vrb}$ that are applied at B-beam port 374 of the vertical manifold structure 372. Receive embodiments can be formed in the antenna 360 by incorporation of receive structures such as shown in FIG. 4D.

Equation (3) above expresses beam squint relative to diffraction. This equation is plotted in the graph 390 of FIG. 9 for three reference scan angles $\theta_r$ of 10°, 30° and 50°. This graph assumes a 16 element antenna operating in the range of 6–18 GHz with an instantaneous bandwidth of 1.5 GHz (e.g., a data bandwidth). As shown, the beam broadening is zero at the reference port beam angles, increases nearly linearly for small scan angles (away from the reference port angle) and increases nonlinearly for larger scan angles.

Figure 9:
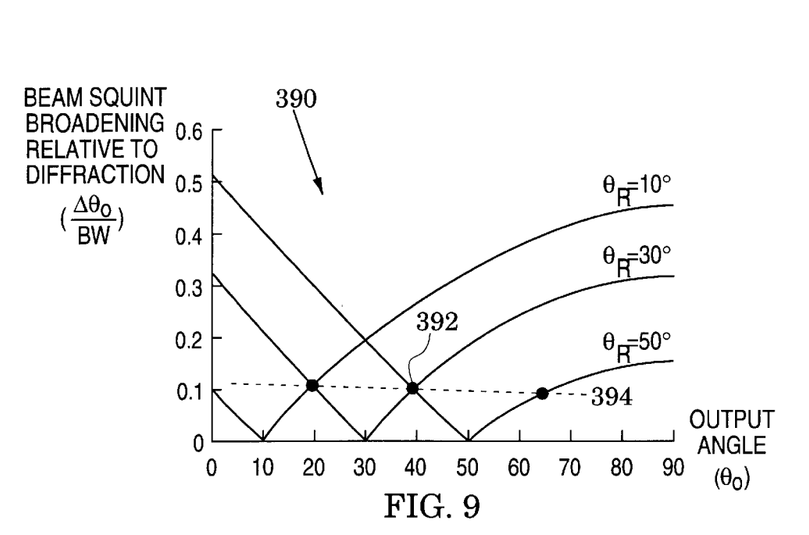
FIG. 9 is a graph which illustrates reduced beam squint in antennas of the invention.

As the antenna is scanned from 0° to 70°, the beam broadening can be reduced by successively switching it (e.g., with a switch similar to 118 of FIG. 2) to the nearest reference port angle. This switching is indicated in FIG. 9 by circles 392 which are connected by a broken line 394. In this exemplary switching, beam squint is kept to a maximum value of ~0.12 as represented by the line 394. In contrast, a conventional phased array antenna would have $\Delta\theta/BW=0.626$ at a 70° scan angle, an increase by a factor of ~5.

Figure 10:
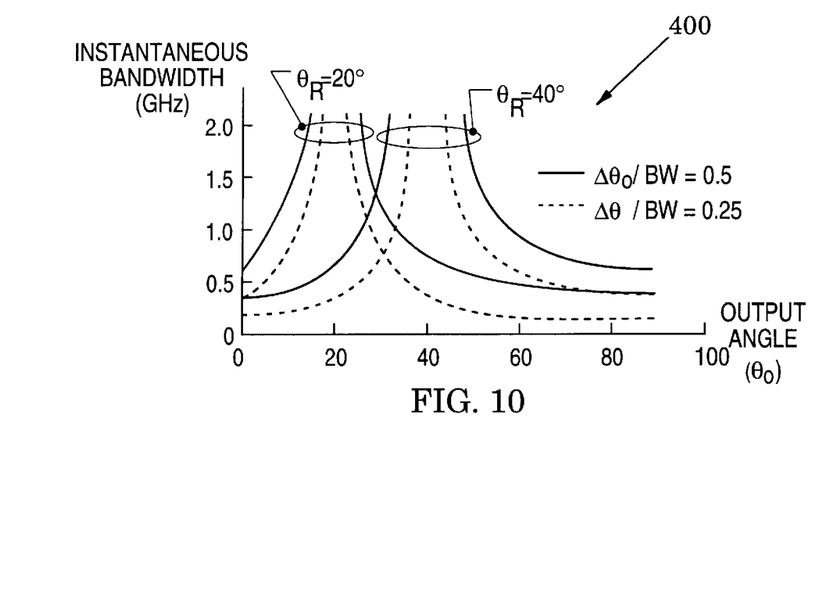
FIG. 10 is a graph which illustrates instantaneous bandwidth in antennas of the invention.

Equation (5) can also be solved for instantaneous bandwidth $\Delta f_o$ as a function of allowable $\Delta\theta_o/BW$. This variation is plotted in graph 400 of FIG. 10. In this graph, the variation is shown for values of $\Delta\theta_o/BW=0.25$ and 0.5. It is assumed that reference ports of 20° and 40° are available and that a 16 element antenna with a maximum design frequency of $f_{max}=3$ GHz is used.

It is noted that instantaneous bandwidth goes to infinity at the reference port angles where the antenna behaves as a true time-delay system. For and allowable $\Delta\theta_o/BW=0.5$, the minimum bandwidth over the range 0° to 60° occurs at broadside and is 0.55 GHz. This corresponds to at least an 18% bandwidth if the antenna is operated at $f_{max}$ or below. Even better performance can be obtained by configuring the 20° reference port to a smaller angle. This will increase the bandwidth at broadside while lowering the 1.2 GHz bandwidth near 30° where the response curves intersect.

The lens structure 244 of FIG. 4C is sometimes referred to as a Rotman lens (e.g., see Johnson, Richard C., et al., *Antenna Engineering Handbook*, Third Edition, Mc-Graw Hill, Inc., New York, 1993, pp. 16–19 to 16–22 and Kumar, A., *Antenna Design with Fiber Optics*, Artech House, Boston, 1996, pp. 51–59). Accordingly, the terms "reference port", "reference manifold" and "reference angle" as used herein may also be referred to as "Rotman port", "Rotman manifold"and "Rotman angle".

When practicing the invention, the choice of the number of reference ports and their reference angles $\theta_r$ will depend upon specific system requirements. Different embodiments of the antenna can be realized with different but substantially equivalent structures. For example, radiators of the invention can be any of various radiator types (e.g., horns, slots and flared notches) and mixing devices of the invention can be of various mixing types (e.g., mixers and diodes).

Electronic signal generator 62 of FIG. 2 illustrates an exemplary generator structure for forming a scanning signal and a reference signal in which the frequency of the reference signal is a selected one of the sum and difference of the frequencies of the scanning signal and an operational signal. Various generator structures can be substituted to realize substantially the same result.

The embodiments of the invention described herein are exemplary and numerous modifications, variations and rearrangements can be readily envisioned to achieve substantially equivalent results, all of which are intended to be embraced within the spirit and scope of the appended claims.

We claim:

1. A phased array antenna, comprising:

an electronic signal generator which generates a variable-frequency scanning signal $s_s$ and a reference signal $s_r$ wherein the frequency of said reference signal $s_r$ is substantially a selected one of the sum and the difference of the frequencies of said scanning signal $s_s$ and an operating signal $s_o$;

a reference manifold that receives and divides said reference signal $s_r$ into n reference signal samples which are progressively time delayed by a selectable one of m reference differential time delays $\Delta t_r$;

a scanning manifold that receives and divides said scanning signal $s_s$ into n scanning signal samples which are progressively time delayed by a scanning differential time delay $\Delta t_s$; and an array of n radiative modules that each include:
 a) a mixing device that receives and mixes a respective one of said reference signal samples and a respective one of said scanning signal samples;
 b) an electromagnetic radiator; and
 c) a filter that couples said mixing device to said radiator and that is configured to pass said operating signal $s_o$;

an antenna beam is thereby radiated from said array at m selectable scan angles with each of said scan angles varying in response to the frequency of said scanning signal $s_s$.

2. The phased array antenna of claim 1, wherein said electronic signal generator includes:

a scanning signal generator which supplies said scanning signal $s_s$;

an operating signal generator which supplies said operating signal $s_o$;

a mixer coupled to said scanning signal generator and said operating signal generator; and a filter coupled to said mixer and configured to pass said reference signal $s_r$.

3. The phased array antenna of claim 1, wherein said scanning manifold includes n transmission lines whose lengths progressively differ by a differential scanning length $\Delta L_s$ that generates said scanning differential time delay $\Delta t_s$, each of said transmission lines having a first end coupled to receive said scanning signal $s_s$ and a second end coupled to a mixer in a respective one of said radiative modules.

4. The phased array antenna of claim 3, wherein said transmission lines are optical transmission lines.

5. The phased array antenna of claim 3, wherein said transmission lines are electrical transmission lines.

6. The phased array antenna of claim 1, wherein said reference manifold includes m selectable sets of n reference transmission lines whose lengths in each of said m sets progressively differ by a respective one of m differential reference lengths $\Delta L_r$, each of said transmission lines having a first end coupled to receive said reference signal $s_r$ and a second end coupled to a mixer in a respective one of said radiative modules.

7. The phased array antenna of claim 6, wherein said transmission lines are optical transmission lines.

8. The phased array antenna of claim 6, wherein said transmission lines are electrical transmission lines.

9. The phased array antenna of claim 1, wherein said reference manifold includes:
   n transmission lines that each have a first end coupled to receive said reference signal $s_r$ and a second end coupled to a mixer in a respective one of said radiative modules; and
   n programmable time delays that are each serially connected with a respective one of said transmission lines to selectively generate said reference differential time delays $\Delta t_r$.

10. The phased array antenna of claim 1, wherein said reference manifold is a Rotman lens that forms m selectable sets of n reference path lengths that differ in each of said m sets by a respective one of m differential reference path lengths $\Delta L_r$.

11. The phased array antenna of claim 10, wherein said Rotman lens includes;
    a lens having first and second lens faces;
    m first antennas positioned on said first lens face; and
    n second antennas positioned on said second lens face wherein said m selectable sets of n reference path lengths are defined by lens paths between said first and second antennas.

12. The phased array antenna of claim 10, wherein said Rotman lens includes;
    a lens having first and second lens faces;
    m optical generators positioned on said first lens face; and
    n photodetectors positioned on said second lens face wherein said m selectable sets of n reference path lengths are defined by lens paths between said first and second antennas.

13. The phased array antenna of claim 1, wherein said scanning manifold and said reference manifold are formed by a Rotman lens that defines n scanning path lengths that differ by a differential scanning path length $\Delta L_r$ and also defines m selectable sets of n reference path lengths that differ in each of said m sets by a respective one of m differential reference path lengths $\Delta L_r$.

14. The phased array antenna of claim 1, wherein said mixing device is a mixer.

15. The phased array antenna of claim 1, wherein said mixing device is a diode.

16. The phased array antenna of claim 1, wherein said radiator is a slot antenna.

17. The phased array antenna of claim 1, wherein said radiator is a horn antenna.

18. The phased array antenna of claim 1, wherein said electronic signal generator includes a data generator that modulates said reference signal $s_r$.

19. A multibeam phased array antenna, comprising:
    an electronic signal generator which generates first and second variable-frequency scanning signals $s_{s1}$ and $s_{s2}$ and first and second reference signals $s_{r1}$ and $s_{r2}$ wherein the frequency of said first reference signal $s_{r1}$ is substantially a selected one of the sum and the difference of the frequencies of said first scanning signal $s_{s1}$ and a first operating signal $s_{o1}$ and the frequency of said second reference signal $s_{r2}$ is substantially a selected one of the sum and the difference of the frequencies of said second scanning signal $s_{s2}$ and a second operating signal $s_{o2}$;
    a reference manifold that receives and divides each of said reference signals $s_{r1}$ and $s_{r2}$ into n reference signal samples which are progressively time delayed by a selectable one of m reference differential time delays $\Delta t_r$;
    a scanning manifold that receives and divides each of said scanning signals $s_{s1}$ and $s_{r2}$ into n scanning signal samples which are progressively time delayed by a scanning differential time delay $\Delta t_s$; and
    an array of n radiative modules that each include:
    a) a first mixing device that receives and mixes a respective one of the reference signal samples of said first reference signal $s_{r1}$ and a respective one of the scanning signal samples of said first scanning signal $s_{s1}$;
    b) a second mixing device that receives and mixes a respective one of the reference signal samples of said second scanning signal $s_{r2}$ and a respective one of the scanning signal samples of said second scanning signal $s_{s2}$;
    c) an electromagnetic radiator; and
    d) first and second filters that respectively couple said first and second mixing devices to said radiator and that are configured to respectively pass said first and second operating signals $s_{o1}$ and $s_{o2}$;
    first and second antenna beams thereby radiated from said array at m selectable scan angles with said scan angles respectively varying in response to the frequency of said first and second scanning signals $s_{s1}$ and $s_{s2}$.

20. The multibeam phased array antenna of claim 19, further including:
    reference wavelength division multiplexers positioned in said reference manifold to steer said first and second reference signals into and out of said reference manifold; and
    scanning wavelength division multiplexers positioned in said scanning manifold to steer said first and second scanning signals into and out of said scanning manifold.

21. A method of forming and scanning an antenna beam, comprising the steps of:
    forming a variable frequency scanning signal $s_s$ and a reference signal $s_r$ whose frequency is a selected one of the sum and the difference of the frequencies of said scanning signal $s_s$ and an operating signal $s_o$;
    dividing said scanning signal into n scanning signal samples;

progressively time delaying said scanning signal samples by a scanning differential time delay $\Delta t_s$;

dividing said reference signal into n reference signal samples;

progressively time delaying said reference signal samples by a selectable one of m reference differential time delays $\Delta t_r$;

mixing each of said scanning signal samples with a respective one of said reference signal samples to generate n sets of mixing products;

filtering said mixing products to recover n phase-shifted signal versions of said operating signal $s_o$; and radiating each of said phase-shifted signal versions from a respective one of n radiators to form an antenna beam having a scan angle that is determined by the selected one of said m reference differential time delays $\Delta t_r$ and by the frequency of said scanning signal $s_s$.

22. The method of claim 21, wherein at least one of said time delaying steps includes a step of passing the respective signals through electrical transmission lines.

23. The method of claim 22, wherein said electrical transmission lines are microstrip lines.

24. The method of claim 21, wherein at least one of said time delaying steps includes a step of passing the respective signals through optical transmission lines.

25. The method of claim 24, wherein said optical transmission lines are optical fibers.

26. The method of claim 21, wherein at least one of said time delaying steps includes a step of passing the respective signals through a Rotman lens.

* * * * *